United States Patent

Abe et al.

[11] Patent Number: 4,457,390
[45] Date of Patent: Jul. 3, 1984

[54] POWER STEERING DEVICE

[75] Inventors: Michio Abe; Naoyuki Maeda, both of Aichi, Japan

[73] Assignee: Tokai TRW & Co. Ltd., Aichi, Japan

[21] Appl. No.: 388,920

[22] Filed: Jun. 16, 1982

[51] Int. Cl.³ .............................................. B62D 5/06
[52] U.S. Cl. ..................................... 180/142; 180/143
[58] Field of Search .............. 180/141, 142, 143, 79.1, 180/79.3

[56] References Cited

U.S. PATENT DOCUMENTS

| 2,978,058 | 4/1961 | Orr | 180/79.3 |
| 3,939,938 | 2/1976 | Inoue | 180/142 |
| 4,056,160 | 11/1977 | Abels et al. | 180/143 |

FOREIGN PATENT DOCUMENTS

| 54-11170 | 4/1976 | Japan. | |
| 54-9774 | 5/1976 | Japan. | |
| 2086323 | 5/1982 | United Kingdom | 180/142 |

Primary Examiner—David M. Mitchell
Assistant Examiner—D. Lynn Fugate
Attorney, Agent, or Firm—Yount & Tarolli

[57] ABSTRACT

A power steering apparatus includes a power steering fluid supply pump which is driven through a clutch. A sensor detects changes in vehicle speed and effects operation of the clutch to decrease the rate at which the pump is driven in response to an increase in vehicle speed. When the vehicle speed exceeds a predetermined speed, the clutch is disengaged and the pump is not driven. When the clutch is disengaged, the steerable vehicle wheels are turned without power assist.

7 Claims, 4 Drawing Figures

POWER STEERING DEVICE

BACKGROUND OF THE INVENTION

This invention relates to a power steering (or assisting) device of an energy saving type, by which steering assistance can be changed in response to changes in operating speed of an engine or to changes in vehicle speed.

In general, it is well known that, preferably, in a power steering device, a supply of fluid under pressure to a power steering motor (actuator) is increased to increase steering assistance when a vehicle is stationary or moving at a slow speed. The supply of fluid under pressure conducted to the power steering motor is decreased to reduce the steering assistance at higher vehicle speeds to thereby increase stability during high speed steering maneuvers.

Heretofore, in order to obtain the above characteristic in a power steering device it has been suggested to provide a power steering device as disclosed in Japanese Patent Publication No. 54-9774. This device uses an electromagnetic clutch to drive a pump which discharges the power steering fluid. The electromagnetic clutch is operated to assist steering when the angle of rotation of the steering wheel exceeds a predetermined value. A larger angle of rotation of the steering wheel usually is required when the vehicle is stationary or moving at a low speed. However, in such a known device, since the degree of power steering is determined by the angle of rotation of the steering wheel, the steering assistance is suddenly applied in the proximity of the predetermined angle of rotation, this is an unstable state which may invite a dangerous condition.

Further, as disclosed in Japanese Patent Publication No. 54-11170, it has been suggested to provide a power steering device in which the supply of the power fluid from an oil pump to a power cylinder is controlled by an electromagnetic bypass valve or is adjusted by a flow adjusting valve in response to a running state of a vehicle. However, the power steering device of this type spends much energy and cannot meet the needs of the energy saving times because, at a higher speed running state of the vehicle, most of the power fluid discharged from an oil pump, which rotates continuously at higher speed in proportion to rotating speed of an engine, is returned to an oil tank without working.

Recently, a measure to save energy shows a tendency to decrease the speed of rotation of an engine at an idling state and to raise the maximum rotational speed of the engine so as to miniaturize and lighten the weight of the engine. However, in a conventional oil pump discharging power fluid and being driven by the engine, there are disadvantages in that the engine will drive the pump at a speed which is insufficient to enable the pump to supply the required power steering fluid when the vehicle is stationary or moving at a slow speed.

SUMMARY OF THE INVENTION

A power steering apparatus constructed in accordance with the present invention is used in a vehicle having an engine or other source of power which drives a power steering pump through a clutch. The clutch includes a rotatable input member and a rotatable output member which is connected with the pump. A control apparatus effects operation of the clutch to decrease the rate of rotation of the output member relative to the rate of rotation of the input member as vehicle speed increases. This results in a reduction in the rate at which fluid is discharged from the pump as vehicle speed incresses. By reducing the rate at which fluid is discharged from the pump with increasing vehicle speed, the amount of power assistance provided during a steering operation is reduced with increasing vehicle speeds. In the absence of a steering operation, for example when the vehicle is being driven straight ahead, the clutch is ineffective to drive the pump or drives the pump at a relatively slow standby speed to prevent the unnecessary use of power. Upon initiation of a steering operation, the clutch drives the power steering pump at a speed which is a function of vehicle speed. When the vehicle is being driven at relatively high speeds, the clutch is disengaged. This is because at relatively high vehicle operating speeds, power assistance is not required during a steering operation.

It is, therefore, an object of the present invention to provide a power steering device of an energy saving type.

Another object of the present invention is to provide a power steering device in which the speed of operation of a pump can be changed in response to changes in vehicle speed.

Another object of this invention is to provide a new and improved power steering apparatus in which the pump for supplying power steering fluid is driven through a clutch and wherein the clutch is operable to decrease the speed at which the pump is driven as the speed of the vehicle increases.

These and other objects and advantages of the present invention will appear more clearly from the following detailed disclosure read in conjunction with the accompanying drawings.

DESCRIPTION OF THE PREFERRED EMBODIMENT

Figure 1:
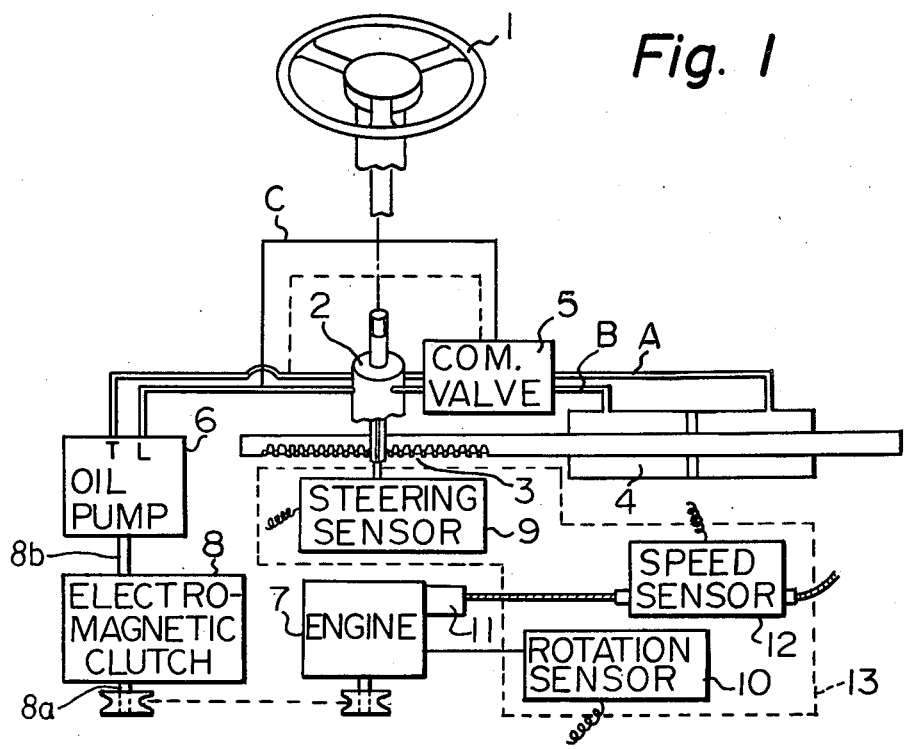
FIG. 1 is a diagramatic view of a preferred embodiment of a power steering system constructed in accordance with the present invention.

FIG. 1 shows a preferred embodiment of a power steering device of the present invention. A steering wheel 1 is coupled through a control valve 2 and a steering gear 3 to an actuator or power steering motor 4. The motor 4 and a bypass valve 5 are connected through the control valve 2 to a power steering fluid pump 6 by means of lines A and B.

The control valve 2 controls the amount and direction of fluid flow from the pump 6 to the motor 4 in response to rotation of the steering wheel 1. The bypass valve 5 acts to close a bypass path between the supply lines A and B of the motor 4 when the bypass valve is actuated by the power fluid in a pilot line C. The pilot line C transmits oil pressure provided by operation of the oil pump 6, thereby effecting a power steering state. The valve 5 opens a bypass path between the supply lines A and B when the pump 6 stops or the rotation thereof is in an extremely low speed state, thereby losing the steering power and effecting a manual steering state. A rotating shaft of an engine 7 is coupled to the oil pump 6 through an electromagnetic clutch 8 having a linear transmission characteristic.

Provided on the steering wheel 1 is also a steering sensor 9 which comprises, for example, a small-sized d.c. generator. An output signal from the generator 6 indicates rotation of the steering wheel 1. An engine rotation sensor 10 provided on the engine 7 detects, for example, an ignition pulse or converts into an analog signal by integrating the pulse to output an electric signal corresponding to the speed of operation of the engine. Also, a speed sensor 12 detects the number of rotations of a wire cable of a speedometer coupled to a transmission gear 11 and outputs electric signals corresponding to vehicle speed.

An electronic control circuit (not shown) receives output signals from the controls 13, that is, the respective output signals from the steering sensor 9, the engine rotation sensor 10 and the speed sensor 12. When the steering wheel 1 is rotated and the output signal from the steering sensor 9 is received by the electronic control circuit, an output signal from an AND logic circuit is amplified so that the output signal from the engine rotation sensor 10 and the output signal from the speed sensor 12 are amplified to apply the amplified AND signal to the electromagnetic clutch 8. Accordingly, a vehicle speed responsive characteristic is added to the electromagnetic clutch 8 having the linear transmission characteristic.

When the vehicle is stopped, an exciting current of a solenoid coil of the electromagnetic clutch 8 comes to a maximum value to transmit the rotation of the engine 7 to the oil pump 6 without slippage. When the vehicle speed is increased, the exciting current is decreased to increase the slippage. Thus, the magnetic field generated by means of the solenoid coil of the electromagnetic clutch 8 is controlled to change electrically the degree of the slippage in the transmission of power from the engine 7 to the pump 6. This enables the power steering fluid pressure to be varied in response to variations in vehicle speed.

In the preferred embodiment, the electromagnetic clutch 8 is operated when the detected signal from the steering sensor 9 indicates that the steering wheel 1 is being rotated. Therefore, the pump 6 is only driven when the steering wheel 1 is being rotated. However, it is possible that the electromagnetic clutch 8 continuously operated by the detected signals from both the speed sensor 12 and the engine rotation sensor 10 over a preset variable area of the transmitting amount so as to drive the oil pump 6. Also, it is easily effected that the electromagnetic clutch 8 is operated in accordance with a variable transmitting amount on the basis of the detected signal from the engine rotation sensor 10 to control the discharging amount of the oil pump 6. Further, although the preferred embodiment provides a valve 5 to bypass both chambers of the actuator 4 and to reduce oil path resistance of the steering at a non-assisting state when the oil pump 6 is stopped or rotated at the extremely low speed, the valve 5 may be removed from the oil lines in view of slight increase in the steering torque at the manual steering state when the oil pump 6 does not discharge the power fluid and mechanical strength of the control valve 2 (torsion bar). Preferably, a powder clutch, a hysteresis clutch and the like are available for the electromagnetic clutch having the linear transmission characteristic, the former using magnetic powder so that, in an excited condition, torque is transmitted by mutually attracting force of the magnetic powder and frictional force between the powder and a transmitting surface of the clutch, and the latter being such that non-contact coupling is magnetically accomplished without using mechanically frictional force.

Figure 2:
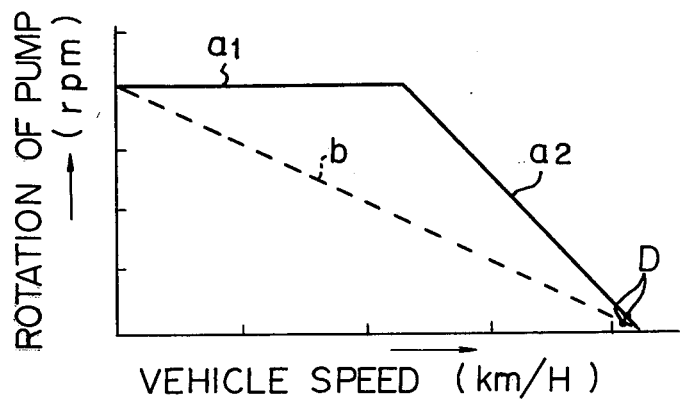
FIGS. 2 and 3 are curves showing a relationship between vehicle speed and the speed of operation of the power steering fluid supply pump of the embodiment of the steering system shown in FIG. 1.

FIG. 2 shows a vehicle speed-rotation of pump characteristic of the power steering device of the present invention. In the drawing, a1 denotes a fixed rotation characteristic of the power steering pump 6, a2 denotes an attenuating rotation characteristic of the pump, b denotes a vehicle speed responsible linear attenuating rotation characteristic, and D denotes an operating point of the bypass valve 5.

Figure 3:
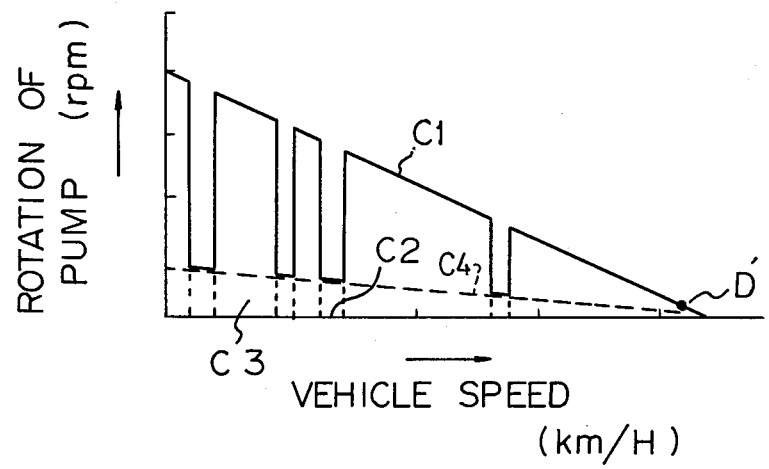

FIG. 3 shows a vehicle speed-rotation of pump characteristic illustrating an energy saving effect of the power steering device of the present invention. In the drawing, c1 denotes a power steering fluid pump characteristic during a steering operation, c2 denotes a pump stopping characteristic during non-steering, and c3 denotes a warming-up, an extremely low-speed, operating characteristic of the power steering pump during non-steering. According to FIG. 3, it is apparent that the supply of the power fluid from the pump 6 is reduced or stopped when the power steering is not required. Also, the communicating valve is operated at a higher speed point D' to bypass the both chambers of the acutator to cause a manual steering state during which the pump 6 is not driven.

Figure 4:
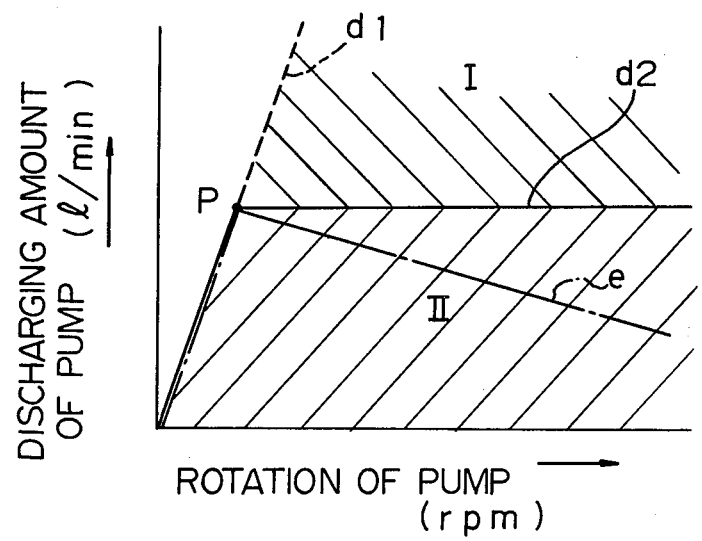
FIG. 4 is a curve showing a relationship between the speed of rotation and the rate of fluid discharge from the power steering pump in a comparison between the present invention and the prior art.

FIG. 4 shows a discharging amount-rotation characteristic of the oil pump to compare a discharging characteristic of the pump 6. The discharging characteristic of the pump 6 is used in the conventional power steering device in which the supply of the power fluid from the oil pump to the power cylinder is adjusted by the flow adjusting valve in accordance with the running state of the vehicle. In the drawing (FIG. 4), d1 denotes an apparent discharging characteristic of the pump 6, d2 denotes a general discharging characteristic of the pump to which a vehicle speed responsive characteristic is not added (under this condition, disused discharging oil is returned to the tank by means of the flow adjusting valve) and e denotes a discharging characteristic of the oil pump of the present invention. Accordingly, in FIG. 4, Area I is an invalid discharging area and, according to the present invention, if the electromagnetic clutch having the linear transmission characteristic is operated in the proximity of a point P then the oil pump can be effectively operated in Area II, that is, a valid discharging area.

Although, in the preferred embodiment as shown in FIG. 1, the electromagnetic clutch 8 is provided to be directly coupled to the oil pump 6, even if an oil pump having smaller size, light weight and a smaller discharging amount is used, it is possible to provide a transmission means for increasing the rotating speed of the oil pump between the clutch and the oil pump to thereby obtain desired steering power at an idling state of the engine or a lower speed running state.

As described above, the present invention, in contrast with an ON-OFF control, can provide the variable steering assistance in accordance with the preset vehicle speed and this, therefore, does not give an operator unstable feeling at the steering. Also, according to the present invention, the changing between the power steering state and the manual steering state can be smoothly effected by the operation of the communicating valve, thereby stabilizing the operation of the steering wheel.

In view of the foregoing, it is apparent that prior to rotation of the steering wheel 1 and during operation of the engine 7, the electromagnetic clutch 8 is maintained in a disengaged condition or a standby condition. At this time, an input shaft 8a to the clutch 8 is being rotated by the engine 7. However, an output shaft 8b is not being rotated or is being rotated at a relatively slow standby speed. Therefore, the pump 6 is not driven or is being driven at a relatively low standby speed prior to rotation of the steering wheel 1.

Upon rotation of the steering wheel 1 while the vehicle is stationary or traveling at a very slow speed, the clutch 8 is fully engaged so that there is little or no slippage in the clutch. At this time, the pump 6 is driven at a relatively high speed to supply fluid at a relatively high flow rate to the power steering motor 4. As vehicle speed increases, an output signal from the speed sensor 12 results in the amount of slippage to clutch 8 increasing with vehicle speed. Due to slippage in the clutch, the speed of rotation of the output shaft 8b decreases relative to the speed of rotation of the input shaft 8a as vehicle speed increases. Of course, decreasing the speed at which the shaft 8b is rotated relative to the speed at which the shaft 8a is rotated results in a decrease in the speed at which the power steering pump 6 is driven. Decreasing the speed at which the power steering pump is driven reduces the rate of flow of fluid to the power steering motor 4 to thereby decrease the power assistance provided during a power steering operation.

When the vehicle is driven above a predetermined speed, that is above the speed indicated at D' in FIG. 3, the clutch 8 is fully disengaged so that the power steering pump 6 is no longer driven by the engine 7. At this time, the bypass valve 5 opens to connect the chambers of the power steering motor 4 in fluid communication with each other to thereby enable the steerable vehicle wheels to be turned under the influence of manual forces applied to the steering wheel 1.

If desired, the clutch 6 can be partially engaged prior to the initiation of a power steering operation. The manner in which this occurs in indicated in FIG. 3. Thus, in the absence of rotation of the steering wheel 1, the power steering pump may be driven at a speed indicated by the dashed line C4 in FIG. 3. This results in the power steering pump being driven at a standby speed, in the absence of a steering operation, indicated by the dashed line C4. The standby speed at which the pump is driven decreases as vehicle speed increases. By driving the pump at a standby speed, in the manner indicated by the dashed line C4 in FIG. 3 prior to initiation of a steering operation, the power steering pump 6 can immediately respond to iniation of a steering operation. Of course, the clutch 8 could be fully disengaged in the absence of a power steering operation, in the manner indicated by the line C2 in FIG. 3.

We claim:

1. An apparatus for operating a power steering motor to turn a steerable vehicle wheel, said apparatus comprising pump means for supplying fluid to the power steering motor, clutch means for transmitting power from a source of power to drive said pump means, said clutch means including a rotatable input member and a rotatable output member connected with said pump means, and control means responsive to vehicle speed and operatively associated with said clutch means for decreasing the rate of rotation of said output member relative to the rate of rotation of said input member as vehicle speed increases.

2. An apparatus as set forth in claim 1 wherein said control means includes sensor means for detecting changes in vehicle speed and means for effecting operation of said clutch means to decrease the rate of rotation of said input member in response to an increase in vehicle speed.

3. An apparatus as set forth in claim 1 wherein said control means includes detector means for detecting rotation of the steering wheel and means for causing said clutch means to increase the rate of rotation of said output member relative to the rate of rotation of said input member in response to rotation of the steering wheel.

4. An apparatus as set forth in claim 1 wherein said control means includes means for causing said clutch means to rotate said output member at a first speed prior to rotation of the steering wheel and for causing said clutch means to rotate said output member at a second speed which is greater than the first speed upon rotation of the steering wheel.

5. An apparatus as set forth in claim 1 wherein said control means includes speed sensor means for detecting when vehicle speed exceeds a predetermined speed and means for rendering said clutch means ineffective to rotate said output member during rotation of said input member at vehicle speeds above a predetermined speed.

6. An apparatus for operating a power steering motor to turn a steerable vehicle wheel, said apparatus comprising pump means for supplying fluid to the power steering motor, clutch means for transmitting power from a source of power to said pump means, said clutch means including a rotatable input member adapted to be rotated by a source of power, a rotatable output member connected with said pump means, and force transmitting means for transmitting rotary forces from said input member to said output member, said force transmitting means being operable between a standby condition in which forces are transmitted from said input member to said output member to rotate said output member at a relatively low standby speed, a second condition in which forces are transmitted from said input member to said output member to rotate said output member at a second speed, and a disengaged condition in which said force transmitting means is ineffective to transmit force from said input member to said output member, first detector means for detecting rotation of the steering wheel, second detector means for detecting when vehicle speed exceeds a predetermined speed, and control means connected with said first and second detector means and said force transmitting means for causing said force transmitting means to shift from the standby condition to the second condition in response to said first detector means detecting initiation of rotation of the steering wheel and for causing said force transmitting means to shift to the disengaged condition in response to said second detector means detecting a vehicle speed in excess of the predetermined speed.

7. An apparatus as set forth in claim 6 wherein said second detector means includes means for detecting variations in vehicle speed, said control means including means for decreasing the standby speed as vehicle speed increases with said force transmitting means in the standby condition.

* * * * *

UNITED STATES PATENT AND TRADEMARK OFFICE
CERTIFICATE OF CORRECTION

PATENT NO. : 4,457,390
DATED : July 3, 1984
INVENTOR(S) : Michio Abe and Naoyuki Maeda It is certified that error appears in the above–identified patent and that said Letters Patent are hereby corrected as shown below:

Column 6, line 6, after "decrease" insert - - the rate of rotation of said output member relative to - -.

Signed and Sealed this

Twenty-third Day of April 1985

[SEAL]

Attest:

DONALD J. QUIGG

Attesting Officer  Acting Commissioner of Patents and Trademarks